United States Patent [19]
Tamura et al.

[11] 4,250,073
[45] Feb. 10, 1981

[54] AROMATIC POLYAMIDE COMPOSITION HAVING POLAR AMIDE AND HALOGENATED HYDROCARBON MIXED SOLVENT

[75] Inventors: Yorikazu Tamura; Akihiro Aoki; Hiroshi Mera; Keizo Shimada, all of Iwakuni, Japan

[73] Assignee: Teijin Limited, Osaka, Japan

[21] Appl. No.: 66,447

[22] Filed: Aug. 14, 1979

[30] Foreign Application Priority Data

Aug. 16, 1978 [JP] Japan .................................. 53-98986
Jun. 26, 1979 [JP] Japan .................................. 54-79611

[51] Int. Cl.³ .......................... C08K 5/17; C08K 5/20; C08L 77/10
[52] U.S. Cl. ............................. 260/32.6 NA; 528/347
[58] Field of Search ................................ 260/32.6 NA

[56] References Cited

U.S. PATENT DOCUMENTS

| | | |
|---|---|---|
| 3,103,496 | 9/1963 | Lohaus et al. ................ 260/32.6 NA |
| 3,240,760 | 3/1966 | Stephens et al. ............. 260/32.6 NA |
| 3,418,275 | 12/1968 | Stephens ..................... 260/32.6 NA |
| 3,485,804 | 12/1969 | Kawabata et al. ........... 260/32.6 NA |

*Primary Examiner*—Joseph L. Schofer
*Assistant Examiner*—Peter F. Kulkosky
*Attorney, Agent, or Firm*—Burgess, Ryan and Wayne

[57] ABSTRACT

An aromatic polyamide composition usable for producing shaped articles, for instance, filaments, comprises the components of an aromatic polyamide resin (P), a polar amide solvent (S) and an auxiliary solvent (H) consisting of a halogenated hydrocarbon, for example, dichloromethane and dichloroethane, the proportions of the components (P), (S) and (H) being on or within a quadrilateral A C D E defined by the co-ordinates:

A (P 5.0, S 30.0, H 65.0 )
C (P 45.0, S 30.0, H 25.0)
D (P 57.0, S 38.0, H 5.0) and
F (P 5.0, S 90.0, H 5.0).

The composition also contains a solubility enhancing agent consisting of one or more inorganic halide, such as alkali metal halides, alkaline earth metal halides and ammonium halides, in amount of from 5 to 60%, based on the weight of the polyamide resin.

13 Claims, 1 Drawing Figure

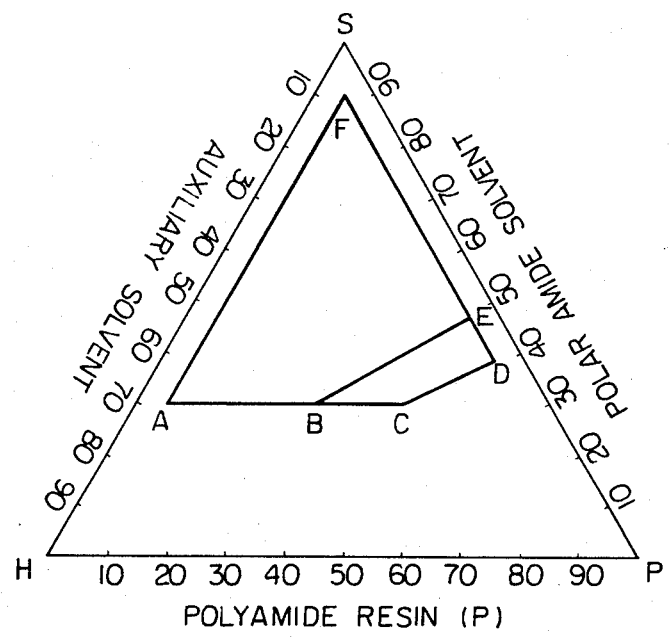

AROMATIC POLYAMIDE COMPOSITION HAVING POLAR AMIDE AND HALOGENATED HYDROCARBON MIXED SOLVENT

FIELD OF THE INVENTION

The present invention relates to an aromatic polyamide composition. More particularly, the present invention relates to an aromatic polyamide composition containing an aromatic polyamide resin dissolved or suspended in a relatively cheap organic solvent and being useful for producing shaped articles, for example, filaments or fibers, therefrom.

BACKGROUND OF THE INVENTION

It is known that the aromatic polyamide resins exhibit excellent thermal properties, for example, a high melting point and an excellent heat resistance, excellent mechanical properties, for example, a high tenacity and a superior abrasion resistance, and an excellent electric insulating property. Accordingly, the aromatic polymer resins are utilized to produce various filaments, fibers, films, sheets and other shaped articles.

Also, it is known that the high melting points of the aromatic polyamide resins are very close to the corresponding special temperatures at which the aromatic polyamide resins are decomposed thermally. Due to this property, usually, it is practically impossible to shape the aromatic polyamide resins by means of a melt-shaping process. Accordingly, in order to produce the shaped articles, such as filaments, films and sheets, from the aromatic polyamide resins, in general, the aromatic polyamide resins are dissolved in a concentration of from 5 to 20% in an organic polar solvent, for instance, dimethyl formamide, N-methyl-2-pyrrolidone and dimethyl acetamide, and the solution is extruded through at least one nozzle, die or orifice into a wet coagulating bath or a dry solidifying atmosphere, so as to eliminate the solvent from the extruded solution. That is, in general, the production of the shaped aromatic polyamide resin articles is carried out by the so-called wet-shaping process or dry-shaping process.

However, in the above-mentioned comventional shaping processes, a large amount of the organic polar solvent, which is expensive, is used to prepare the solution of the aromatic polyamide resin, and also, a large amount of other organic solvent is used to recover the organic polar solvent. The use of the large amount of the organic polar solvent and the recovering solvent results in a high cost of the shaping process of the aromatic polyamide resin articles.

Furthermore, it is known that, in spite of the fact that the expensive polar solvent is used in a large amount, the shaping property, for example, spinning property and film-forming property, of the conventional aromatic polyamide composition is not always satisfactory.

Under these circumstances, it is strongly desired to provide an aromatic polyamide composition which comprises a relatively cheap solvent in a relatively small amount and which has an enhanced shaping property.

For the purpose of attaining the above-mentioned desire, attempts were made to use a solution of the aromatic polyamide resin in a high concentration, in the shaping process of the aromatic polyamide articles. This solution is effective for reducing the consumption of the expensive polar solvent and, thus, for minimizing the cost of the shaping process. However, some of the aromatic polyamide resin, for example, m-phenylene isophthalamide unit-containing polyamides which are most popular and most useful for producing the shaped articles, exhibit a special tendency to crystallize and become insoluble in the polar solvent when the concentration of the aromatic polyamide in the solution is about 23% by weight or more and the temperature of the solution is 80° C. or more. That is, at the above-mentioned temperature and in the above-mentioned concentration, the aromatic polyamide is deposited in the form of crystals from the solution. The above-mentioned high concentration of the solution cannot be utilized in the shaping process.

Each of Japanese Patent Applications Laying-open Nos. 52-13545, 52-15675, 52-53068, 52-98764 and 52-101298 discloses a method in which the m-phenylene isophthalamide unit-containing polyamide resin is completely dissolved in an excessive amount of the polar solvent selected from N-methyl-2-pyrrolidone, hexamethyl phosphoramide, 2-pyrrolidone and ε-caprolactam, and; then, the excessive amount of the polar solvent is evaporated away from the solution by heating the solution at an elevated temperature, under a reduced pressure, so as to provide a crystalline complex of the polyamide and the polar solvent. However, the above-mentioned process for producing the crystalline complex exhibits the following disadvantages.

1. Since the polar solvent is used in a larger amount than that of the conventional method, this method cannot attain the desire of reducing the consumption of the polar solvent.

2. The evaporative operation of the polar solvent from the solution requires a large amount of energy and labor.

3. The crystalline complex of the polyamide resin and the polar solvent is stable only at a low temperature and for a short time from the its preparation. Therefore, it is difficult to utilize the crystalline complex in the shaping process at an elevated temperature. Usually, the crystalline complex connot be used in an industrial shaping process.

SUMMARY OF THE PRESENT INVENTION

An object of the present invention is to provide an aromatic polyamide composition in which an expensive polar solvent is used in a small amount.

Another object of the present invention is to provide an aromatic polyamide composition in which the aromatic polyamide resin is contained in a high concentration.

Still another object of the present invention is to provide an aromatic polyamide composition having a high stability at an elevated temperature.

A further object of the present invention is to provide an aromatic polyamide composition having an excellent shaping property.

The above-mentioned objects can be attained by the aromatic polyamide composition of the present invention which comprises the components of:

a polymer resin (P) consisting of at least one aromatic polyamide;

an organic solvent (S) consisting of at least one organic amide compound;

an auxiliary solvent (H) consisting of at least one halogenated hydrocarbon, and;

a solubility-enhancing agent consisting of at least one inorganic halide selected from the group consisting of alkali metal halides, alkaline earth metal halides and ammonium halides, in an amount of from 5 to 60%, based on the weight of the polymer resin component, the proportions by weight of the polymer resin (P), the organic solvent (S) and the auxiliary solvent (H) in the composition being on or within a quadrilateral, in a triangular composition diagram, defined by the co-ordinates A, C, D and F:

A (P 5.0, S 30.0, H 65.0)
C (P 45.0, S 30.0, H 25.0)
D (P 57.0, S 38.0, H 5.0) and
F (P 5.0, S 90.0, H 5.0).

The halogenated hydrocarbons are recognized as cheap and low toxic liquids having a lower boiling point than that of the polar amide solvents. It is also known not only that the halogenated hydrocarbons cannot dissolve the aromatic polyamide resins therein, even at an elevated temperature and even when used in a large amount, but also, that the halogenated hydrocarbons act as a coagulating or gelatinizing agent for the aromatic polyamide resins when added into the solutions of the aromatic polyamide resins in the polar solvents. Accordingly, it was long believed in the aromatic polyamide industry that a solvent containing the halogenated hydrocarbons could not dissolve the aromatic polyamide resins therein, even in the presence of the inorganic halide compound.

However, the present inventors surprisingly discovered that the halogenated hydrocarbons can serve as an auxiliary solvent for the aromatic polyamide resins when the proportions by weight of the polyamide resin component (P), the polar solvent component (S) and the auxiliary solvent component (H) in the composition are one or within the above-defined quadrilateral A C D E, and the special solubility-enhancing agent is presents in the compositon in the amount mentioned above. Also, it was discovered that the auxiliary solvent is effective for enhancing the thermal stability and the shaping property of the aromatic polyamide composition. Furthermore, since the use of the auxiliary solvent which is cheap results in a reduction of the amount of the expensive polar solvent used, the cost of the resultant aromatic polyamide composition becomes cheaper than that of the conventional composition.

Moreover, the auxiliary solvent is effective for causing the resultant composition to exhibit a low viscosity without coagulation or gelatinization of the polyamide resin from the composition.

BRIEF DESCRIPTION OF THE DRAWING

The drawing is a triangular composition diagram showing a range of the proportions of the polymer resin component (P), the polar solvent component (S) and the auxiliary solvent component (H) usable for the present invention.

DETAILED DESCRIPTION OF THE INVENTION

Referring to the accompanying drawing, the proportions by weight of the polymer resin component (P), the polar solvent component (S) and the auxiliary solvent component (H) in the composition of the present invention are on or within the quadrilateral defined by co-ordinate A, C, D and F:

A (P 5.0, S 30.0, H 65.0)
C (P 45.0, S 30.0, H 25.0)
D (P 57.0, S 38.0, H 5.0) and
F (P 5.0, S 90.0, H 5.0).

The preferable range of the proportions is on or within the quadrilateral defined by co-ordinates A, B, E and F:

A (P 5.0, S 30.0, H 65.0)
B (P 30.0, S 30.0, H 40.0)
E (P 48.0, S 47.0, H 5.0) and
F (P 5.0, S 90.0, H 5.0).

If the proportions of the polymer resin component (P), the polar solvent (S) and the auxiliary solvent (H) in the composition fall outside of the quadrilateral defined by the co-ordinates A, C, D and F, the resultant composition is unstable and is sometimes coagulated or gelatinized. Therefore, this composition cannot be utilized for the shaping process.

The aromatic polyamide usable for the composition of the present invention preferably has at least one repeating unit selected from the group consisting of those of the formulae (I) and (II):

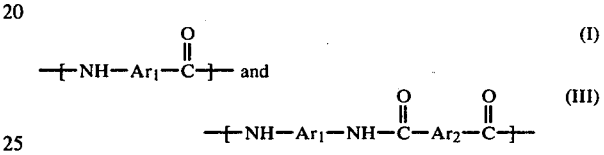

wherein $Ar_1$ and $Ar_2$ respectively represent, independently from each other, an unsubstituted or substituted divalent aromatic radical which comprises a single aromatic ring or two or more aromatic rings that may be the same as or different from each other and that may be condensed together or are linked together by a single bond, or by a bridging atom or radical, and which is oriented either meta or para.

The polyamide may be a homopolymer consisting of the repeating units of either one of the formulae (I) and (II) or may be a copolymer consisting of the repeating units of both the formulae (I) and (II). Also, the polyamide may be a copolymer comprising at least 75 molar % of the repeating units selected from those of the formulae (I) and (II).

It is preferable that the moieties $Ar_1$ and $Ar_2$ in the formulae (I) and (II) are respectively selected, independently from each other, from the group consisting of the radicals of the formulae:

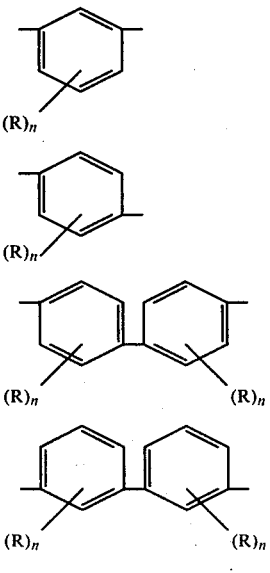

-continued

wherein R represents a member selected from the group consisting of lower alkyl radicals having 1 to 6 carbon atoms, lower alkoxy radicals having 1 to 6 carbon atoms, halogen atoms, phenyl, acyl, carboalkoxy, acyloxy, dialkylamino, thioalkyl, carboxyl, and sulfonic acid and a nitro radicals, n represents zero or an integer of from 1 to 4 and X represents a member selected from the group consisting of

wherein Y represents a member selected from the group consisting of a hydrogen atom and lower alkyl radicals having 1 to 6 carbon atoms.

It is also preferable that the aromatic polyamide contain at least 25 molar % of m-phenylene structure

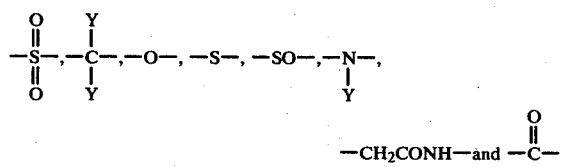

and that the balance consist of p-phenylene structure

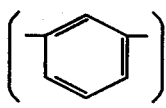

It is more preferable that the aromatic polyamide have at least 75 molar % of a repeating m-phenylene isophthalamide unit of the formula:

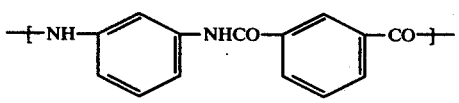

The aromatic polyamide of the formula (II) can be prepared by any conventional condensation polymerization methods, for instance, a solution polymerization method for an interfacial polymerization method, applied to an aromatic dicarboxylic acid component and an aromatic diamine component. Preferably, the aromatic polyamide is prepared by the means of a solution polymerization of the aromatic dicarboxylic acid component and the aromatic diamine component in a polar solvent at a low temperature of, for example, from 50° to 70° C.

The aromatic dicarboxylic acid component may consist of at least one member selected from the group consisting of isophthalic acid chloride, terephthalic acid chloride, 1,4-naphthalene dicarboxylic acid chloride, 2,6-naphthalene dicarboxylic acid chloride, diphenylsulfone-4,4'-dicarboxylic acid chloride, 4,4'-diphenyl dicarboxylic acid chloride, 4,4-diphenyldicarboxylic acid chloride, 3-chloroisophthalic acid chloride, 3-methoxyisophthalic acid chloride and bis(p-chlorocarbonylphenyl) ether. The aromatic diamine component may consist of at least one member selected from the group consisting of m-phenylene diamine, p-phenylene diamine, benzidine, 4,4'-diaminodiphenyl ether, 3,4'-diaminodiphenyl ether, xylylene diamine, toluene diamine 4,4'-diaminodiphenyl sulfone chlorophenylene diamine, bromophenylene diamine, acetylphenylene diamine, aminoanisidine, 1,5-naphthylene diamine, bis-(aminophenyl) ether, bis(aminophenyl)ketone, bis-(aminophenyl)phenylamine and bis('p-aminophenyl)methane.

The most preferable aromatic dicarboxylic acid component and diamine component are isophthalic acid chloride and m-phenylene diamine, respectively.

In order to provide an aromatic polyamide having a high degree of crystallinity, it is preferable that each of the aromatic dicarboxylic acid and diamine components consists of a single compound or of at least 90 molar % of a compound and the balance consisting of one or more other compounds. Also, in order to provide an aromatic polyamide having a high degree of solubility, it is preferable that either one or each of the aromatic dicarboxylic acid or diamine components consists of two or more compounds each in an amount of more than 10%.

The aromatic polyamide of the formula (I) can be produced by polycondensing an aromatic aminocarboxylic acid halide (HX.H₂N-Ar₁—COX, wherein Ar₁ and X are as defined above, respectively). The above-mentioned aromatic dicarboxylic acid component may contain a small amount of the aromatic aminocarboxylic acid halide. The solution polymerization process may be carried out at a low temperature of from 50° to 70° C. in accordance with the method, for example, described in Japanese Patent Application Publication (Kokoku) No. 35-14399(1960). the solvent usable for the low temperature solution polymerization can be selected from the group consisting of dimethyl acetamide, N-methyl-2-pyrrolidone, hexamethyl phosphoramide, N-methyl-ε-caprolactam, tetramethyl urea and N-acetyl pyrrolidine. The most preferable solvents are dimethyl acetamide and N-methyl-2-pyrrolidone.

The polar solvent usable for the present invention is not limited to a special amide compound, and, thus, can be selected from various amide compounds, as long as the amide compounds are capable of dissolving the aromatic polyamide resins therein. Preferably, the amide compound is selected from the group consisting of dimethyl formamide, dimethyl acetamide, N-methyl-2-pyrrolidone, hexamethyl phosphoramide, tetramethyl urea and N-acetyl pyrrolidine.

In the composition of the present invention, a portion of the polar amide solvent which is expensive and has a relatively high boiling point, is replaced with the auxiliary solvent consisting of one or more halogenated hydrocarbons, which is cheaper than the polar solvent and has a lower boiling point than that of the polar solvent, so as to reduce the amount of the expensive polar solvent used to dissolve the aromatic polymer resin.

It should be noted that, surprisingly, it was discovered that the auxiliary solvent is effective for causing the aromatic polyamide composition of the present invention to exhibit a high thermal stability and a excellent shaping property.

The halogenated hydrocarbons usable for the present invention may be selected from aliphatic halogenated hydrocarbons having 1 to 3 carbon atoms. This type of halogenated hydrocarbons usually have a boiling point of 200° C. or less.

The halogenated hydrocarbons may involve chlorinated hydrocarbons, for example, monochloromethane, dichloromethane, trichloromethane, 1,1-dichloroethane, 1,2-dichloroethane, 1,1,2-trichloroethane and 1,1,2,2-tetrachloroethane; brominated hydrocarbons, for example, monochromomethane and dibromoethane, and; fluorinated chlorinated hydrocarbons, for instance, trichlorofluoroethane. Usually, more the preferable halogenated hydrocarbons are chlorinated hydrocarbons, such as dichloromethane, 1,2-dichloroethane, 1,1,2-trichloroethane and 1,1,2,2-tetrachloroethane due to a low price and a high availability thereof.

In the aromatic polyamide composition, it is important that the solubility-enhancing agent consisting of the inorganic halide compounds presents in the amount of from 5 to 60%, halide from 10 to 50%, by weight based on the weight of the polymer resin component.

The solubility enhancing agent is effective for increasing the solubility of the polyamide resin in the mixture of the polar solvent and the auxiliary solvent, for maintaining the resultant polyamide resin solution stabilized, and for prevention the coagulation and the gelatinization of the solution.

However, if the content of the solubility-enhancing agent is less than 5%, the resultant solution will exhibit a poor stability, and thus, cannot be utilized for the practical use. On the other hand, if the content of the solubility-enhancing agent is more than 60%, the resultant solution will undesirably exhibit a remarkably higher viscosity than a viscosity which is expected from the concentration of the polyamide resin in the solution.

The inorganic halide compound may be selected from the group consisting of alkali metal halides, for example, lithium chloride and lithium bromide; alkaline metal halides, for instance, calcium chloride, magnesium chloride and calcium bromide, and; ammonium halides, for instance, ammonium chloride and ammonium bromide.

It was known previously that solutions of 25% by weight or less of the aromatic polyamide resins in the polar solvents can be stabilized by the above-mentioned type of inorganic halide compounds. However, it was not expected that the halogenated hydrocarbons, which are coagulating or gelatinizing agents for the aromatic polyamide resins, could enhance the solubility of the polyamide resins in the polar solvents, or that the inorganic halide compounds could stabilize the halogenated hydrocarbon-containing solution of the aromatic polyamide resins in the polar solvents.

The aromatic polyamide composition of the present invention can be prepared by any conventional mixing method. Typically, a powdered aromatic polyamide resin is uniformly mixed with a powdered inorganic halide compound at a predetermined mixing ratio, the mixture is cooled to a temperature of from 0° to 10° C., and then, the mixture is admixed at a predetermined admixing ratio into a solvent mixture of the polar solvent and the auxiliary solvent at a predetermined mixing ratio, so as to provide a homogeneous solution.

In the conventional method for the preparation of a solution of a m-phenylene isophthalamide polymer type polyamide resin in the polar solvent consisting of the organic amide compound, the polyamide resin is mixed with the polar solvent at a very low temperature of −10° C. or less, so as to prepare a slurry. Thereafter, the slurry is converted into a homogeneous solution by heating it at an elevated temperature of, for example, from 60° to 80° C. This method is very effective for obtaining the homogeneous solution. However, in this method, the cooling operation must be carried out at a very low temperature of −10° C. or less. This cooling operation causes the method to be expensive, and to require a large amount of energy. Contrary to this, in the composition of the present invention, the admixture of the mixture of the aromatic polyamide resin and the inorganic halide compound with the auxiliary solvent, easily forms a homogeneous slurry at a temperature of from 0° to 10° C., and the slurry can be easily converted into a homogeneous solution by slightly heating it at a temperature of from 20° to 60° C.

In another method for the preparation of the composition of the present invention, the inorganic halide compound is dissoled in the polar amide solvent, and then, the solution is mixed with the polyamide resin and the auxiliary solvent.

In still another method, the polar amide solvent and the organic halide auxiliary solvent are separately mixed with the polyamide resin and the inorganic halide compound.

In a further method, a mixture is provided from the polymer resin, the polar amide solvent and the inorganic halide compound, and then, the auxiliary solvent is added to the above-mentioned mixture while stirring it.

Moreover, the composition of the present invention may be produced in such a process that a mixture of an aromatic diamine component and an aromatic dicarboxylic acid halide component, or at least one aromatic aminocarboxylic acid halide is subjected to a low temperature solution polymerization process in a polar solvent to provide a solution of an aromatic polyamide in the polar solvent, and, then, the hydrogen halide which is a by-product of the above polymerization process, is neutralized with a neutralizing agent, and before, during and/or after the polymerization process and/or during and/or after the neutralizing process, a necessary amount of an auxiliary solvent consisting of at least one halogenated hydrocarbon is added to the neutralized aromatic polyamide solution in the polar solvent.

The polymerization operation may be carried out in accordance with the afore-mentioned method. In this case, a solution of a necessary amount of an aromatic diamine component in a polar solvent is cooled to a low temperature of, for example, from −25° to 70° C., and then, a necessary amount of an aromatic dicarboxylic acid halide component in the state of powder, flaks or melt, is added to the above-prepared cooled solution. The solution of the aromatic polyamide may be prepared by the following method. In accordance with Example 14 of Japanese Patent Application Publication (Kokoku) No. 35-14399, a portion of the necessary amount of the aromatic dicarboxylic acid halide component is added to the cooled aromatic diamine solution to produce a prepolymer solution. The prepolymer solution is neutralized with ammonia ($NH_3$) and the resultant ammonium halide, which is insoluble in the polar solvent, is removed from the neutralized prepolymer solution by means of filtration. Thereafter, the remaining portion of the aromatic dicarboxylic acid halide component is added to the prepolymer solution to provide an aromatic polyamide solution. The above-mentioned method is advantageous in that it is possible to control the amount of the solubility-enhancing agent in the aromatic polyamide solution.

The neutralizing agent may contain at least one member selected from the group consisting of oxides, hydroxides, hydrides and carbonates of metals of the I and II groups in the Periodic Table of Elements. That is, the neutralizing agent preferably contains one or more members selected from lithium carbonate, lithium oxide, lithium hydroxide, lithium hydroxide monohydrate, lithium hydride, calcium oxide, calcium hydroxide, magnesium oxide, magnesium hydroxide and magnesium carbonate. Especially, the oxides and hydroxides of calcium and magnesium are more preferable for the neutralizing agent. The calcium oxide and calcium hydroxide are most preferable for the neutralizing agent. The above-mentioned metal compounds are harmless to the human body.

The neutralizing operation is carried out preferably at a temperature of from 0° to 15° C. The neutralizing temperatures at the initial, middle and final stages of the neutralizing operation may be different from or the same as each other, as long as the temperatures are suitable for smoothly carrying out the neutralizing operation. Also, it is preferable that the neutralizing operation is carried out while stirring or kneading the aromatic polyamide solution. This is effective for uniformly and completely neutralizing the aromatic polyamide solution.

In the case where the auxiliary solvent consisting of one or more halogenated hydrocarbons is added to the polymerization mixture before the start of the polymerization reaction, the auxiliary solvent may be mixed with a solution of the aromatic diamine component in the polar solvent, or may dissolve the aromatic dicarboxylic acid halide component therein. In this case, the aromatic dicarboxylic acid halide component can be smoothly mixed into the polymerization system, and the resultant polymerization reaction heat can be effectively absorbed or removed from the polymerization system.

The auxiliary solvent may be added to the polymerization mixture during the polymerization operation. The addition of the auxiliary solvent either before or during the polymerization reaction, is effective for reducing the viscosity of the polymerization mixture and for enhancing the stirring effect for the polymerization mixture. Expecially, when the polymerization mixture contains 25% by weight or more of the aromatic polyamide, the addition of the auxiliary solvent is effective for increasing the degree of polymerization of the produced aromatic polyamide and, also, for reducing the difference in the degree of polymerization between the polymers produced in separate polymerization vessels.

The auxiliary solvent may be added to the polymerization mixture after the completion of the polymerization operation and before, during or after the neutralizing operation. In this case, there is an advantage in that the viscosity of the polymerization mixture is significantly reduced and, therefore, the neutralizing reaction can be smoothly and completely effected. However, it is most preferable that the auxiliary solvent is added to the polymerization mixture before or during the polymerization operation.

Sometimes, the addition of the auxiliary solvent causes the polymerization mixture to be become cloudy depending on the amount of the auxiliary solvent added and the composition of the polymerization mixture. However, the polymerization mixture will become clear while continuing the polymerization operation. Otherwise, the addition of the auxiliary solvent should be effected a certain time after the start of the polymerization operation.

The above-mentioned method for preparing the aromatic polyamide composition of the present invention is advantageous in that the composition can be obtained from the component monomers through a relatively short and simple process without isolating, drying, screening and dissolving operations of the aromatic polyamide.

The composition of the present invention is cheaper than the conventional composition and exhibits a lower viscosity, and a high stability and shaping property, for example, filament-forming property, than those of the conventional composition. Therefore, the composition of the present invention can be advantageously utilized for producing shaped articles, for example, filaments, fibers, films, sheets, fibrids and other articles, by any dry, wet, semidry or semiwet shaping method. Furthermore since the composition of the present invention contains a considerable amount of auxiliary solvent having a low boiling point, the shaped composition can be easily solidified by means of evaporating.

It should be noted that the aromatic polyamide composition of the present invention exhibits an excellent filament-forming property, that is, spinning property. In the spinning process, the aromatic polyamide composition is, if necessary, conditioned at a desired temperature, for example, 40° to 100° C., and extruded through a spinning orifice having a number of spinning holes, to form a number of filamentary streams of the composition, and then, the filamentary streams are coagulated in a coagulating liquid. The extruded filamentary streams of the composition may be directly forwarded into the coagulating liquid in accordance with a wet spinning method. Otherwise, the extruded filamentary streams of the composition may be forwarded into a drying air atmosphere, in which a portion of the polar solvent-auxiliary solvent mixture is evaporated away, and then, into the coagulating liquid in accordance with a dryjet spinning method; or the extruded filamentary streams of the composition may be introduced into a spinning chimney heated at an elevated temperature, for example, 100° to 300° C., so as to evaporate a portion of the polar solvent-auxiliary solvent mixture, and then, into the coagulating liquid in accordance with a semi dry semi wet spinning method.

The coagulating liquid may be any usual coagulating liquid usable for spinning the conventional aromatic polyamide compositions. Usually, the coagulating liquid consists of an aqueous solution of a coagulating agent. The coagulating agent contains at least one member selected from the group consisting of $CaCl_2$, $BaCl_2$, $ZnCl_2$, NaCl, $AlCl_3$, $SnCl_2$, NiCl, $SrCl_2$, LiCl, $Ca(NO_3)_2$, $CaBr_2$, $Al(NO_3)_3$, $Zn(NO_3)_2$ and $Ca(SCN)_2$. When the coagulating liquid contains 20% by weight or more of the coagulating agent consisting of one or more of the above-mentioned compounds, the resultant aromatic polyamide filaments exhibit a dense structure and an excellent quality in appearance, mechanical strength and thermal property. Also, an aqueous coagulating liquid containing 30% by weight of an alkylene glycol, for example, polyethylene glycol and polypropylene glycol, and a non-aqueous coagulating liquid consisting of a halogenated hydrocarbon, for instance, dichloromethane and 1,2-dichloroethane, are useful for producing a high quality of aromatic polyamide filaments.

In the coagulating process, it is important that the temperature of the coagulating liquid be maintained lower than the boiling point of the auxiliary solvent contained in the composition.

The coagulated filaments of the aromatic polyamide are washed with water, drawn in boiling water at a desired draw ratio, for example, 1.1 to 3.0, and then, if necessary, additionally drawn on a hot plate having an elevated temperature of, for instance, 250° to 350° C., at a desired draw ratio of, for example 1.1 to 3.0.

The following specific examples are presented for the purpose of clarifying the present invention. However, it should be understood that these are intended only to be examples of the present invention and are not intended to limit the present invention in any way.

EXAMPLE 1 AND COMPARISON EXAMPLE 1

In Example 1, 10 parts by weight of a polyamide resin containing 97 molar % of m-phenylene isophthalamide unit and 3 molar % of m-phenylene terephthalmide unit, and having an inherent viscosity of 1.36 determined at a concentration of 5% thereof in N-methyl-2-pyrrolidone at a temperature of 30° C., were uniformly mixed with 2 parts by weight of powdered calcium chloride having a mesh size less than 200. Separately, 18.6 parts by weight of dimethyl acetamide were mixed with 10 parts by weight of dichloromethane and the resultant solvent mixture was cooled to a temperature of 5° C. by using ice water. The cooled solvent mixture was admixed with the above-prepared polyamide-calcium chloride mixture while cooling the admixture with ice water and stirring it. A paste-like slurry was obtained. The slurry was maintained at room temperature for 5 hours. The slurry was converted into a clear solution of the polyamide resin. The polyamide solution contained 25.9% by weight of the polyamide resin (P), 48.2% by weight of the polar amide solvent (S), 25.9% by weight of the dichloromethane auxiliary solvent (H) and, also, the calcium chloride in an amount of 20%, based on the weight of the polyamide resin (P).

The polyamide solution was subjected to a measurement of viscosity by using a flow tester with a nozzle having an inside diameter (D) of 0.5 mm and a ratio (L/D) of length (L) to the inside diameter (D) of the nozzle, of 8. The measurement was repeated four times, each at a temperature indicated in Table 1, at a shear stress of $3.0 \times 10^5$ $dyn/cm^2$.

In Comparison Example 1, the same procedures as those mentioned in Example 1 were carried out, except that the dichloromethane was replaced with the dimethyl acetamide.

The results of Example 1 and Comparison Example 1 were indicated in Table 1.

TABLE 1

| | Item | | | |
|---|---|---|---|---|
| | Viscosity (poise) Temperature °C. | | | |
| Example No. | 25 | 35 | 45 | 60 |
| Example 1 | 4,510 | 2,400 | 1,320 | 580 |
| Comparison Example 1 | 60,000 | 27,000 | 14,000 | 6,000 |

Table 1 shows that the viscosity of the composition of Comparison Example 1 is more than ten times that of Example 1. That is, the dichloromethane auxiliary solvent is extremely effective for reducing the viscosity of the polyamide composition.

EXAMPLES 2 THROUGH 4

In each of Examples 2 through 4, procedures identical to those mentioned in Example 1 were carried out, except that the proportions of the poly-m-phenylene isophthalamide resin, the dimethyl acetamide polar solvent and the dichloromethane auxiliary solvent were as indicated in Table 2. The calcium chloride was used in an amount of 20%, based on the weight of the polyamide resin.

The results are also shown in Table 2.

TABLE 2

| | Item | | | | | |
|---|---|---|---|---|---|---|
| | Proportion (% by wt) | | | | | |
| Example No. | Polyamide resin (P) | Polar amide solvent (S) | Auxiliary solvent (H) | Viscosity (poise) Temperature | | |
| | | | | 25° C. | 35° C. | 45° C. |
| 2 | 29.8 | 55.3 | 14.9 | 14,300 | 7,500 | 4,500 |
| 3 | 23.0 | 42.6 | 34.4 | 1,650 | 900 | 520 |
| 4 | 20.6 | 38.2 | 41.2 | 700 | 420 | 240 |

Table 2 shows that the increase in the proportion of the dichloromethane auxiliary solvent results in a significant reduction in the viscosity of the composition, in spite of the fact the decrease in the proportion of the polyamide resin is small. That is, although the proportion of the polyamide resin in the composition of Example 4 is about ⅔ times that in Example 2, the viscosity of the composition of Example 4 is 1/20 times that of Example 2.

EXAMPLES 5 THROUGH 8

In each of Examples 5 through 8, the same procedures as those described in Example 1 were carried out, except that the polyamide resin, the dimenthyl acetamide polar solvent and the dichloromethane auxiliary solvent were used in the proportions as indicated in Table 3, and the calcium chloride was used in an amount as indicated in Table 3, based on the weight of the polyamide resin. Also, the measurement of the viscosity of the composition was carried out at a temperature of 35° C. and at a shear stress as indicated in Table 3.

TABLE 3

| Example No. | Proportion (% by wt) Polyamide resin (P) | Proportion (% by wt) Polar amide solvent (S) | Proportion (% by wt) Auxiliary solvent (H) | Ratio by wt $CaCl_2$ / Polyamide resin | Viscosity (poise) Shear Stress (dyn/cm$^2$) $3.0 \times 10^5$ | $6.0 \times 10^5$ | $9.0 \times 10^5$ | $1.2 \times 10^6$ |
|---|---|---|---|---|---|---|---|---|
| 5 | 23.8 | 40.5 | 35.7 | 25/100 | 5,260 | 2,580 | 1,400 | 1,000 |
| 6 | 21.3 | 36.2 | 42.5 | " | 1,420 | 790 | 560 | 480 |
| 7 | 25.0 | 37.5 | 37.5 | 30/100 | 8,300 | 3,000 | 2,400 | 1,400 |
| 8 | 22.2 | 33.3 | 44.5 | " | 2,000 | 1,500 | 920 | 610 |

EXAMPLES 9 THROUGH 24

In each of the Examples 9 through 24, the same operations as those described in Example 1 were carried out, except that the dichloromethane auxiliary solvent was replaced with 1,2-dichloroethane and the polyamide resin, and the dimethyl acetamide and the 1,2-dichloroethane were used in the proportions as indicated in Table 4. The calcium chloride was used in the ratio in weight to the polyamide resin as shown in Table 4.

Table 4 also shows the viscosities at 40°, 60° and 80° C., of the composition of each example.

TABLE 4

| Ex. No. | Polyamide resin (P) | Polar amide solvent (S) | Auxiliary solvent (H) | Ratio in wt $CaCl_2$ / polyamide resin | Viscosity (poise) Temperature °C. 40 | 60 | 80 |
|---|---|---|---|---|---|---|---|
| 9 | 29.8 | 55.3 | 14.9 | 20/100 | 9,020 | 2,600 | 940 |
| 10 | 25.9 | 48.2 | 25.9 | 20/100 | 1,500 | 668 | 300 |
| 11 | 23.0 | 42.6 | 34.4 | 20/100 | 752 | 429 | 268 |
| 12 | 20.6 | 38.2 | 41.2 | 20/100 | 300 | 225 | 134 |
| 13 | 23.8 | 40.5 | 35.7 | 25/100 | 1,073 | 451 | 250 |
| 14 | 25.0 | 37.5 | 37.5 | 30/100 | 4,930 | 2,600 | 1,130 |
| 15 | 26.0 | 66.6 | 7.4 | 20/100 | 600 | 250 | 150 |
| 16 | 26.0 | 62.9 | 11.1 | 20/100 | 750 | 530 | 155 |
| 17 | 26.0 | 59.2 | 14.8 | 20/100 | 750 | 320 | 170 |
| 18 | 26.0 | 55.5 | 18.5 | 20/100 | 1,000 | 450 | 225 |
| 19 | 26.0 | 51.8 | 22.2 | 20/100 | 1,320 | 560 | 300 |
| 20 | 30.0 | 63.0 | 7.0 | 20/100 | 5,260 | 1,800 | 835 |
| 21 | 30.0 | 56.0 | 14.0 | 20/100 | 6,500 | 2,400 | 1,070 |
| 22 | 30.0 | 49.0 | 21.0 | 20/100 | 10,500 | 5,260 | 1,670 |
| 23 | 30.0 | 42.0 | 28.0 | 20/100 | 24,000 | 9,020 | 3,760 |
| 24 | 30.0 | 35.0 | 35.0 | 20/100 | 46,000 | 24,000 | 15,000 |

EXAMPLES 25 THROUGH 33

In each of the Examples 25 through 33, the same operations as those mentioned in Example 1 were conducted, except that the dimethyl acetamide polar solvent was replaced with N-methyl-2-pyrrolidone, and the polyamide resin, the N-methyl-2-pyrrolidone polar solvent and the dichloromethane auxiliary solvent were used in the proportions as indicated in Table 5. Also, the ratio in weight of calcium chloride to the polyamide resin was as indicated in Table 5.

The viscosity of each composition was measured at temperatures of 45°, 60° and 70° C. The results are shown in Table 5.

TABLE 5

| Ex. No. | Polyamide resin (P) | Polar amide solvent (S) | Auxiliary solvent (H) | Ratio in wt $CaCl_3$ / Polyamide resin | Viscosity (poise) Temperature (°C.) 45 | 60 | 70 |
|---|---|---|---|---|---|---|---|
| 25 | 26.0 | 66.6 | 7.4 | 20/100 | 1,320 | 752 | 500 |
| 26 | " | 59.2 | 14.8 | " | 1,500 | 820 | 564 |
| 27 | " | 51.8 | 22.2 | " | 3,500 | 1,500 | 1,000 |
| 28 | " | 44.4 | 29.6 | " | 6,000 | 3,000 | 1,800 |
| 29 | " | 37.0 | 37.0 | " | 21,000 | 13,500 | 10,000 |
| 30 | 29.8 | 55.3 | 14.9 | " | 12,000 | 6,400 | 3,800 |
| 31 | 25.9 | 48.2 | 25.9 | " | 3,760 | 2,000 | 1,500 |
| 32 | 23.0 | 42.6 | 34.4 | " | 1,690 | 752 | 500 |
| 33 | 20.6 | 38.2 | 41.2 | " | 540 | 313 | 190 |

EXAMPLES 34 THROUGH 38

In each of the Examples 34 through 38, the same procedures as those described in Example 1 were carried out, except that the calcium chloride was replaced with lithium chloride, the dimethyl acetamide polar solvent was replaced with dimethyl formamide, and the polyamide resin, the dimethyl formamide polar solvent and the dichloromethane auxiliary solvent were used in the proportions as indicated in Table 6. The ratio in weight of lithium chloride to the polyamide resin in each composition is also shown in Table 6. Table 6 shows the viscosities of each composition at temperatures of 40°, 50° and 60° C. It is clear from Table 6 that the compositions of Examples 34 through 38 exhibit relatively low viscosities.

TABLE 6

| Ex. No. | Polyamide resin (P) | Polar solvent (S) | Auxiliary solvent (H) | Ratio in wt LiCl / Polyamide resin | Viscosity (poise) Temperature (°C.) 40 | 50 | 60 |
|---|---|---|---|---|---|---|---|
| 34 | 26.0 | 66.6 | 7.4 | 15/100 | 215 | 137 | 107 |
| 35 | " | 59.2 | 14.8 | " | 282 | 188 | 141 |
| 36 | " | 51.8 | 22.2 | " | 1,130 | 626 | 340 |
| 37 | " | 44.4 | 29.6 | " | 1,073 | 644 | 423 |
| 38 | " | 37.0 | 37.0 | " | 6,200 | 3,000 | 1,500 |

EXAMPLES 39 THROUGH 42 AND COMPARISON EXAMPLE 2

In each of the Examples 39 through 42 and Comparison Example 2, the same procedures as those described in Example 1 were carried out, except that the polyamide resin calcium chloride and the dimethyl acetamide polar solvent were respectively used in amounts of 35 parts, 7 parts and 65 parts by weight, and the dichloromethane auxiliary solvent was used in an amount as indicated in Table 7.

The viscosity of each composition was measured at a temperature of 45° C., at a shear stress of $3.0 \times 10^5$ dyn/cm$^2$. The results are shown in Table 7.

TABLE 7

| | Item | |
|---|---|---|
| Example No. | Amount of Dichloromethane auxiliary solvent (part by wt) | Viscosity (poise) (at 45° C.) |
| Comparison Example 2 | 0 | 14,000 |
| Example 39 | 17.5 | 4,500 |
| " 40 | 35.0 | 1,320 |
| " 41 | 52.5 | 520 |
| " 42 | 70.0 | 240 |

Table 7 clearly shows that the increase in the proportion of the dichloromethane auxiliary solvent causes the viscosity of the resultant composition to significantly decrease.

COMPARISON EXAMPLES 3 THROUGH 12

In each of Comparison Examples 3 through 12, the same procedures as those described in Example 1 were carried out, except that the polyamide resin, the polar solvent of the type as indicated in Table 8, the dichloromethane auxiliary solvent and calcium chloride were respectively used in the amounts as indicated in Table 8. The property of each composition is indicated in Table 8.

EXAMPLE 43

The same polyamide resin composition as that described in Example 1 was subjected to the following spinning process.

The composition was extruded at a temperature of 70° C. through a sinneret having 5 spinning holes, each having an inside diameter of 0.1 mm, and introduced into an aqueous coagulating liquid containing 43% by weight of calcium chloride at a temperature of 70° C. The resultant undrawn filaments were washed with water, drawn in hot water at a temperature of 95° C., at a draw ratio of 2.5, dried on a hot drying roller at a temperature of 120° C. and, then, additionally drawn on a hot plate at a temperature of 350° C. at a draw ratio of 1.6. The drawn filaments were taken up at a speed of 32 m/min.

The resultant filaments exhibited a proper gloss, a denier of individual filament of 15, a tensile strength of 4.9 g/d, an ultimate elongation of 25% and an initial Young's modulus of 73 g/d.

EXAMPLES 44 THROUGH 46

In each of the Examples 44 through 46, the same procedures as those described in Example 43 were carried out, except that the proportions of the polyamide resin, the dimethyl acetamide polar solvent and the dichloromethane auxiliary solvent in the composition, the temperature of the coagulating liquid and the take-up speed of the resultant filaments were as indicated in Table 9. The amount of the calcium chloride in each composition was 20%, based on the weight of the polyamide resin.

The properties of the resultant filaments are shown in Table 9.

TABLE 8

| | Item | | | | | |
|---|---|---|---|---|---|---|
| Comparison Example No. | Proportion (% by wt) | | | | Ratio in wt CaCl$_2$ / Polyamide resin | Property of composition |
| | Polyamide resin (P) | Polar Solvent (S) | | Auxiliary solvent (H) | | |
| | | Type | Amount | | | |
| 3 | 20.0 | Dimethyl acetamide | 24.0 | 56.0 | 20/100 | Gelatinized at 60° C. |
| 4 | 20.0 | Dimethyl formamide | 24.0 | 56.0 | 20/100 | Gelatinized at room temperature |
| 5 | 26.0 | Dimethyl acetamide | 22.0 | 52.0 | 20/100 | Gelatinized at 50° C. |
| 6 | 26.0 | Dimethyl formamide | 22.0 | 52.0 | 20/100 | Gelatinized at room temperature |
| 7 | 30.0 | Dimethyl acetamide | 21.0 | 49.0 | 20/100 | " |
| 8 | 30.0 | Dimethyl formamide | 21.0 | 49.0 | 20/100 | " |
| 9 | 65.0 | Dimethyl acetamide | 33.0 | 2.0 | 20/100 | " |
| 10 | 26.0 | " | 67.0 | 7.0 | 5/100 | " |
| 11 | 30.0 | " | 67.0 | 7.0 | 5/100 | " |
| 12 | 26.0 | " | 67.0 | 7.0 | 65/100 | impossible to use for shaping process due to its extremely high viscosity |

TABLE 9

| | Item | | | | | | | | |
|---|---|---|---|---|---|---|---|---|---|
| | Proportion (% by wt) | | | Spinning Proon | | Property of Filament | | | |
| Example No. | Polyamide resin (P) | Polar amide solvent (S) | Auxiliary solvent (H) | Temperature of coagulating liquid (°C.) | Take-up speed (m/min) | Denier (d) | Tensile strength (g/d) | Ultimate elongation (%) | Young's modulus (g/d) |
| 44 | 29.8 | 55.3 | 14.9 | 70 | 20 | 17 | 4.7 | 23 | 85 |
| 45 | 23.0 | 42.6 | 34.4 | 60 | 35 | 14 | 5.4 | 27 | 70 |
| 46 | 20.6 | 38.2 | 41.2 | 40 | 33 | 10 | 5.3 | 31 | 87 |

EXAMPLES 47 THROUGH 51

In each of the Examples 47 through 51, the same procedures as those described in Example 43 were carried out with the following exceptions.

The dichloromethane auxiliary solvent was replaced with 1,2-dichloroethane. The polyamide resin, the dimethyl acetamide polar solvent and the 1,2-dichloroethane were used in the proportions as indicated in Table 10, and the calcium chloride was used in the amount as indicated in Table 10, based on the weight of the polyamide resin. Also, the coagulation operation was carried out at the temperature as indicated in Table 10 and the take-up operation was carried out at the speed as indicated in Table 10. The properties of the resultant filaments are shown in Table 10.

TABLE 10

| | Item | | | | | | | | |
|---|---|---|---|---|---|---|---|---|---|
| | Proportion (% by wt) | | | Amount of CaCl$_2$ (% based on polyamide resin) | Temperature of coagulating liquid (°C.) | Spinning | | Property of filament | |
| Example No. | Polyamide resin (P) | Polar amide solvent (S) | Auxiliary solvent (H) | | | Take-up speed (m/min) | Denier (d) | Tensile strength (g/d) | Ultimate elongation (%) | Young's modulus (g/d) |
| 47 | 29.8 | 55.3 | 14.9 | 20 | 90 | 20 | 18 | 5.1 | 23 | 83 |
| 48 | 25.9 | 48.2 | 25.9 | " | 80 | 35 | 15 | 5.0 | 25 | 93 |
| 49 | 23.0 | 42.6 | 34.4 | " | " | 40 | 12 | 5.3 | 22 | 86 |
| 50 | 20.6 | 38.2 | 41.2 | " | 60 | 30 | 13 | 4.9 | 28 | 87 |
| 51 | 23.8 | 40.5 | 35.7 | 25 | 80 | 26 | 14 | 4.8 | 29 | 91 |

EXAMPLE 52

108.14 parts by weight of m-phenylene diamine were dissolved in a mixture of 483.7 parts by weight of N-methyl-2-pyrrolidone, which had been dehydrated by using a molecular sieve, with 313.9 parts by weight of chloromethylene, and the solution was cooled to a temperature of 0° C. 203.54 parts by weight of powdered isophthalic acid chloride were admixed into the above-prepared solution, while vigorously stirring the admixture, at a temperature of 60° to 65° C., to provide poly-m-phenylene isophthalamide having a degree of polymerization of 1.95.

The resultant polymerization mixture was neutralized with 74.1 parts by weight of calcium hydroxide. The resultant polyamide composition contained the polyamide resin (P), the N-methyl-2-pyrrolidone polar solvent (S) and the chloromethylene auxiliary solvent (H) in the proportions of:

P 23.0, S 46.7 and H 30.3.

Also, the polyamide composition contained calcium chloride in an amount of 46.7%, based on the weight of the polyamide resin.

The polyamide composition was subjected to the same spinning and drawing processes as those described in Example 43.

The resulting filaments exhibited a dennier of individual filament of 14, a tensile strength of 5.2 g/d, an utimate elongation of 27% and an Young's modulus of 87 g/d.

EXAMPLE 53

The same procedures as those described in Example 43 were carried out, except that the polyamide composition was extruded through a sinneret having 10 spinning holes, each having an inside diameter of 0.1 mm, into a coagulating bath consisting of dipropylene glycol, at a temperature of 65° C., and the coagulated filaments were washed with water, drawn in hot water at a draw ratio of 2.3, at a temperature of 95° C., drived on a hot drying roller at a temperature of 120° C., and then, additionally drawn on a hot plate at a temperature of 350° C., at a draw ratio of 1.8.

The resultant filaments had a proper gloss and exhibited a dennier of individual filament of 32, a tensile strength of 5.0 g/d, an ultimate elongation of 28% and an initial Young's modulus of 88 g/d.

EXAMPLES 54 AND 55

In each of the Examples 54 and 55, a solution of 108.14 g of m-phenylene diamine in 483.7 g of N-methyl-2-pyrrolidone was cooled to a temperature of 0° C. Another solution of 203.54 g of isophthalic acid chloride in chloromethylene in an amount as indicated in Table 11 was mixed with the above-cooled solution to provide a polymerization mixture. The polymerization was carried out in the same manner as that mentioned in Example 52. After the completion of the polymerization, 74.1 g of calcium hydroxide was added to the polymerization mixture to neutralize it. The proportions of the aromatic polyamide resin (P), the polar solvent (S) and the auxiliary solvent (H) in the resultant compositon and the degree of polymerization of the aromatic polyamide resin are indicated in Table 11.

TABLE 11

| Example No. | Amount of chloromethylene (g) | Degree of polymerization of aromatic polyamide | Proportion (% by weight) | | |
|---|---|---|---|---|---|
| | | | Polyamide resin (P) | Polar amide solvent (S) | Auxiliary solvent (H) |
| 54 | 160.4 | 1.80 | 27.0 | 54.5 | 18.2 |
| 55 | 72.2 | 1.79 | 30.0 | 60.9 | 9.1 |

COMPARATIVE EXAMPLE 13

The same polymerization operation as that described in Example 54 was carried out, except that no chloromethylene was used and 203.54 g of powdered isophthalic acid chloride were added to the cooled m-phenylene diamine solution. With the progress of the polymerization reaction, the viscosity of the polymerization mixture significantly increased to such an extent that the stirring operation for the polymerization mixture became impossible. Thereafter 74.1 g of calcium hydroxide was added to the polymerization mixture. However, it failed to uniformly neutralize the polymerization mixture due to the excessively high viscosity thereof. The resultant polyamide exhibited a poor degree of polymerization of 1.50.

EXAMPLE 56

A solution of 108.14 g of m-phenylene diamine in a mixture of 678.2 g of N-mehtyl-2-pyrrolidone with 407.2 g of chloroethylene was cooled to a temperature of 0° C. 203.54 g of powdered isophthalic acid chloride were added to the cooled solution while stirring the resultant polymerization mixture. The polymerization reaction was carried out in the same manner as that mentioned in Example 52.

After the polymerization reaction was completed, the reaction mixture was neutralized with 74.1 g of calcium hydroxide. The resultant polyamide exhibited a degree of polymerization of 1.81. The proportions of the polyamide resin (P), the polar solvent (S) and the auxiliary solvent (H) in the resultant composition are as follows.

P: 18.0% by weight
S: 51.2 by weight
H: 30.8 by weight

What we claim is:

1. An aromatic polyamide composition comprising the components of:
   a polymer resin (P) consisting of at least one aromatic polyamide;
   a polar solvent (S) consisting of at least one organic amide compound;
   an auxiliary solvent (H) consisting of at least one halogenated hydrocarbon, and;
   a solubility-enhancing agent consisting of at least one inorganic halide, selected from the group consisting of alkali metal halides, alkaline earth metal halides and ammonium halides, in an amount of from 5 to 60% based on the weight of said polymer resin component, the proportions by weight of said polymer resin component (P), said polar solvent component (S) and said auxiliary solvent component (H) in said composition being on or within a quadrilateral, in a triangular composition diagram, defined by the co-ordinates A, C, D and F:
   A (P 5.0, S 30.0, H 65.0)
   C (P 45.0, S 30.0, H 25.0)
   D (P 57.0, S 38.0, H 5.0) and
   F (P 5.0, S 90.0, H 5.0).

2. An aromatic polyamide composition as claimed in claim 1, wherein said proportions by weight of said polymer resin component (P), said polar solvent component (S) and said auxiliary solvent component (H) in said composition is on or within a quadrilateral, in said triangular composition diagram, defined by the co-ordinates A B E F:
   A (P 5.0, S 30.0, H 65.0)
   B (P 30.0, S 30.0, H 40.0)
   E (P 48.0, S 47.0, H 5.0)
   F (P 5.0, S 90.0, H 5.0)

3. An aromatic polymer composition as claimed in claim 1, wherein said aromatic polyamide has at least one repeating unit selected from the group consisting of those of the formulae (I) and (II):

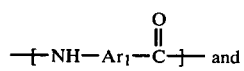 (I)

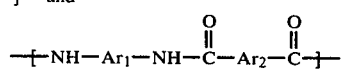 (III)

wherein Ar₁ and Ar₂ respectively represent, independently from each other, an unsubstituted or substituted divalent aromatic radical which comprises a single aromatic ring or two or more aromatic rings that are the same as or different from each other, and that are condensed together or are linked together by a single bond, or by a bridging atom or radical, and which is oriented either meta or para.

4. An aromatic polyamide composition as claimed in claim 3, wherein said Ar₁ and Ar₂ in the formulae (I) and (II) are respectively selected, independently from each other, from the group consisting of the radicals of the formulae:

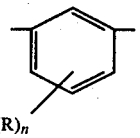

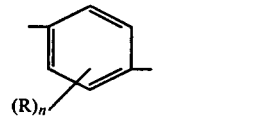

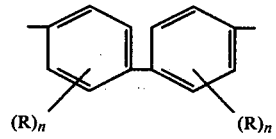

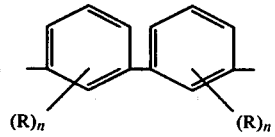

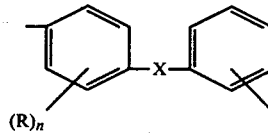

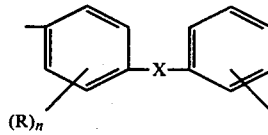

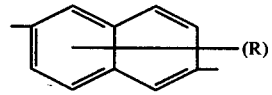

wherein R represents a member selected from the group consisting of lower alkyl radicals having 1 to 6 carbon atoms, lower alkoxy radicals having 1 to 6 carbon atoms, halogen atoms and a nitro radicals, n represents zero or an integer of from 1 to 4 and X represents a member selected from the group consisting of

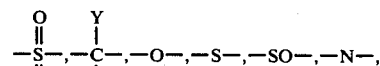

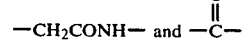

wherein Y represents a member selected from the group consisting of a hydrogen atom and lower alkyl radicals having 1 to 6 carbon atoms.

5. An aromatic polyamide composition as claimed in claim 1, wherein said aromatic polyamide contains at least 25 molar % of m-phenylene structure, the balance consisting of p-phenylene structure.

6. An aromatic polyamide composition as claimed in claim 1, wherein said aromatic polyamide has at least 75 molar % of a repeating m-phenylene isophthalemide unit.

7. An aromatic polyamide composition as claimed in claim 1, wherein said organic amide compound is selected from the group consisting of dimethylformamide, dimethylacetamide, N-methyl-2-pyrrolidone, hexamethyl phosphoramide, tetramethyl urea and N-acetylpyrrolidine.

8. An aromatic polyamide composition as claimed in claim 1, wherein said halogenated hydrocarbon is a halogenated aliphatic hydrocarbon having 1 to 3 carbon atoms.

9. An aromatic polyamide composition as claimed in claim 8, wherein said halogenated aliphatic hydrocarbon is selected from the group consisting of monochloromethane, dichloromethane, trichloromethane, 1,1-dichloroethane, 1,2-dichloroethane, 1,1,2-trichloroethane, 1,1,2,2-tetrachloroethane, monobromomethane, dibromoethane and trichlorotrifluoroethane.

10. An aromatic polyamide composition as claimed in claim 1, wherein said halide is selected from the group consisting of lithium chloride, culcium chloride, magnesium chloride, lithium bromide, calcium bromide and ammonium chloride.

11. An aromatic polyamide composition as claimed in claim 1, wherein said composition is in the state of a slurry or a solution.

12. A spinning solution for producing aromatic polyamide filaments or fibers, which consists of the aromatic polyamide composition as claimed in claim 1.

13. Filaments or fibers produced by using said spinning solution as claimed in claime 11.

* * * * *

UNITED STATES PATENT AND TRADEMARK OFFICE
CERTIFICATE OF CORRECTION

PATENT NO.  : 4,250,073

DATED       : February 10, 1981

INVENTOR(S) : Yorikazu Tamura et al.

It is certified that error appears in the above—identified patent and that said Letters Patent is hereby corrected as shown below:

Column 1, line 43: "comventional" should be --conventional--.

Column 2, line 40: "connot" should be --cannot--.

Column 3, line 35: "presents" should be --present--.

Column 5, line 15: "(R)" should be --$(R)_n$--.

Column 7, line 39: "prevention" should be --preventing--.

Column 8, line 32: "dissoled" should be --dissolved--.

Column 10, line 12: delete "be".

Column 12, line 59: "dimenthyl" should be --dimethyl--.

Column 18, lines 43-44: "compositon" should be --composition--.

United States Patent and Trademark Office

CERTIFICATE OF CORRECTION

PATENT NO. : 4,250,073
DATED : February 10, 1981
INVENTOR(S) : Yorikazu Tamura et al.

It is certified that error appears in the above—identified patent and that said Letters Patent is hereby corrected as shown below:

Column 19, line 6: "mehtyl" should be --methyl--.

Column 20, line 51: "(R)" should be --$(R)_n$--.

line 65: "O" (second occurrence) should be --Y--.

Column 22, line 21: "claime" should be --claim--.

Signed and Sealed this

First Day of December 1981

[SEAL]

Attest:

GERALD J. MOSSINGHOFF

Attesting Officer   Commissioner of Patents and Trademarks